United States Patent
Wugofski (12)

(10) Patent No.: US 6,317,143 B1
(45) Date of Patent: Nov. 13, 2001

(54) PROGRAMMABLE GRAPHICAL USER INTERFACE CONTROL SYSTEM AND METHOD

(75) Inventor: Theodore D. Wugofski, Fort Worth, TX (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 09/237,483

(22) Filed: Jan. 26, 1999

(51) Int. Cl.[7] ...................................................... G06F 3/00
(52) U.S. Cl. .......................... 345/765; 345/825; 345/764; 345/826; 345/762
(58) Field of Search .................................. 345/333, 329, 345/339, 334, 762, 804, 825, 902, 744, 826, 764, 861, 765; 709/201, 220; 717/1, 11, 10

(56) References Cited

U.S. PATENT DOCUMENTS

| | | | |
|---|---|---|---|
| 5,625,783 | * | 4/1997 | Ezekiel et al. ....................... 709/320 |
| 5,721,825 | * | 2/1998 | Lawson et al. ....................... 709/203 |
| 5,767,849 | * | 9/1998 | Borgendale et al. ................. 345/355 |
| 5,774,720 | * | 6/1998 | Borgendale et al. ................. 709/329 |
| 5,815,653 | * | 9/1998 | You et al. .............................. 714/38 |
| 6,061,692 | * | 5/2000 | Thomas et al. ....................... 707/200 |

* cited by examiner

*Primary Examiner*—John Cabeca
*Assistant Examiner*—Kieu D. Vu
(74) *Attorney, Agent, or Firm*—Kenneth J. Cool; Owen J. Gamon; Schwegman, Lundberg, Woessner & Kluth

(57) ABSTRACT

The present invention provides method and apparatus for defining and redefining a dynamic graphical user interface, which can control multiple applications or applets with one graphical user interface. As new applications or applets are launched, the graphical user interface determines the functionality of the newly added application. Existing functions are used if they are equal to functions required of the new application or applet. New functionality is added if required.

7 Claims, 2 Drawing Sheets

PROGRAMMABLE GRAPHICAL USER INTERFACE CONTROL SYSTEM AND METHOD

FIELD OF THE INVENTION

The present invention pertains to user interfaces for multimedia entertainment and computing systems, particularly to devices and methods for controlling the various components in such systems.

BACKGROUND OF THE INVENTION

The home electronics industry, in the midst of an on-going convergence of televisions and computers, has produced a new class of products, known as PC-TV systems, or personal-computer-television systems. In their simplest form, these systems allow users to selectively switch between using a video monitor, or display, to watch television or to support computer activities, like word processing, creating spread sheets, playing computer games, or even surfing the world wide web. A seminal example, the Gateway Destination PC-TV system, from Gateway 2000, Inc., not only weds a television to a personal computer, but allows system expansion to include video-cassette recorders, laserdisc players, video cameras, direct-broadcast-satellite receivers, and so forth.

Another feature of systems such as the Gateway Destination system is the use of a remote control, or wireless keyboard, placed some distance from the computer, so that users may participate in home entertainment as a family, instead of individually. Due to the number of components capable of being connected in such a system, control of the various components can become tedious. A graphical user interface displayed on the computer screen may allow individual control of the components of the system.

A number of application programs for communication and navigation on the Internet and world wide web are in common use, such as Netscape Navigator and Microsoft Internet Explorer. These programs or browsers communicate with remote computer systems via the Internet or other computer network. When executed, the browser software causes the computer to operate a network communication device such as a modem. When browsing the world wide web, a user navigates to different environments, known as web pages. On these web pages, any number of features may be present, including applets.

An applet is a small application that is often present on world wide web sites. Applets are typically also shipped with an operating or a larger product, such as the calculator that comes with Windows. Applets on world wide web sites are often written in a programming language known as Java. Java is a platform-independent programming language. Java programs are commonly referred to as applets since they are most often used for small, transportable programs.

Applets are commonly loaded into a web browser when a user is navigating web pages. The applets may modify their own user interfaces. Applications taking the form of software stored on the hard drive of a computer also have graphical user interfaces for control of the applications. These user interfaces are modifiable by the user and by the program as well. Each application or applet has its own individual user interface.

Each individual user interface of an application or applet may contain a large number of functionalities. In certain instances, the functionalities of user interfaces may overlap to a small or even large degree. Applications and applets may modify their own user interfaces. However, each application or applet has its own functionality setup, and each application or applet generally has its own specific user interface. The various user interfaces are all separate. They do not act together or in a consistent manner.

Many consumer electronic appliances having screen displays, such as set top boxes, televisions, VCRs, and the like, are increasingly being connected to a home computer-based audio/video/computer system. An example of such a system is the Gateway Destination PC-TV system manufactured by Gateway 2000, Inc. Many such consumer electric appliances have severely limited on screen display (OSD) generators. Further, many of these types of appliances also have no windowing. In the computer-oriented marketplace, OSDs and windowing have become important tools for the management of various user preferences for such appliances.

It would be desirable to provide a graphical user interface having increased capability.

SUMMARY OF THE INVENTION

To address these and other shortcomings, the inventor devised an apparatus and method of programming a graphical user interface to define and redefine the graphical user interface according to functionality of various applications and applets.

In one embodiment, a software module for programming a graphical user interface is provided. The software module communicates with and is responsive to applications and applets, and their individual and collective functionality. Such functionality information is supplied by or retrieved from an application or applet, and the software creates, defines, and redefines the graphical user interface when a new application or applet is launched.

A method embodiment of the present invention for defining a graphical user interface in response to the functionality of an application or applet comprises operating or launching a first application, retrieving functionality information of the first application, defining a graphical user interface for controlling the functionality of the first application, and controlling the first application with the defined GUI. When additional applications or applets are launched, the method redefines the GUI in response to additional functionality information provided by the new application or applet. The new application or applet may be controlled along with the previous application or applet.

Another embodiment of the present invention is a shared graphical user interface capable of control of a plurality of computer applications or applets. The shared graphical user interface is defined and redefined as different applications or applets are launched, by receiving information from the applets or from software designed to retrieve the functionality of the applications or applets.

A machine readable medium embodiment of the invention comprises machine readable instructions for causing a computer to perform a method comprising operating a user interface to a first application, retrieving functionality information of the first application, defining a graphical user interface for controlling the functionality of the first application, and controlling the first application with the defined GUI. A further embodiment of the machine readable instructions causes the computer to retrieve the functionality of a second application or applet launched in the computer, and integrates the functionality of the second application into the graphical user interface. The machine readable medium may integrate any number of applications or applets into the GUI, subject only to the physical limits imposed by the available memory, storage, and hardware. Further, the GUI may incorporate functionality of consumer electric appliances, allowing a programmable GUI for set-top boxes, televisions, VCRs, and the like.

Other embodiments and advantages of the invention will become apparent after considering the accompanying drawings and the following detailed description.

DESCRIPTION OF THE EMBODIMENTS

Figure 1:
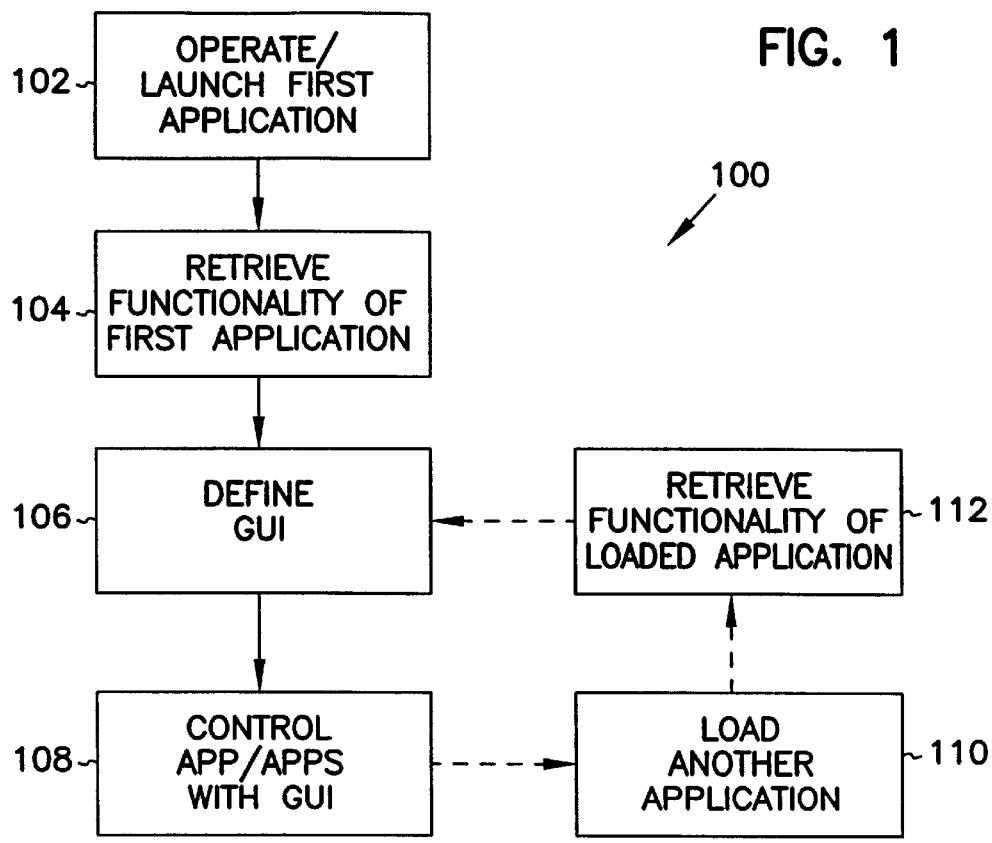
FIG. 1 is a flowchart block diagram of a method embodiment of the present invention.
Figure 2:
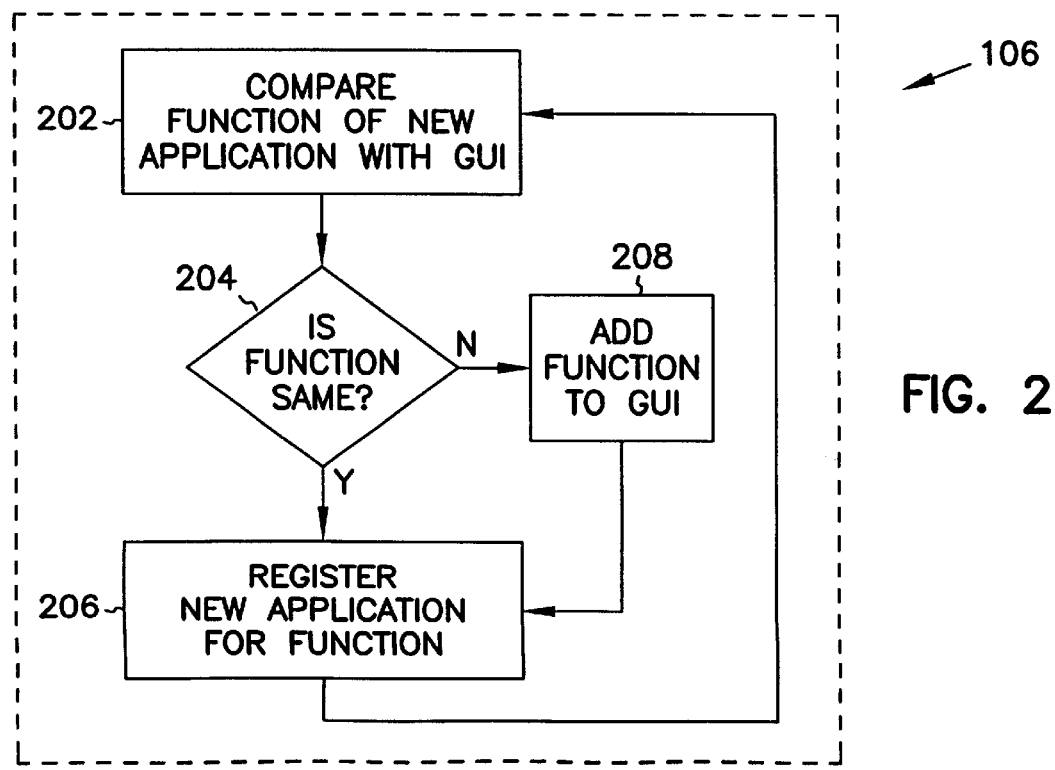
FIG. 2 is a flowchart block diagram of a further refinement of the embodiment of FIG. 1.
Figure 3:
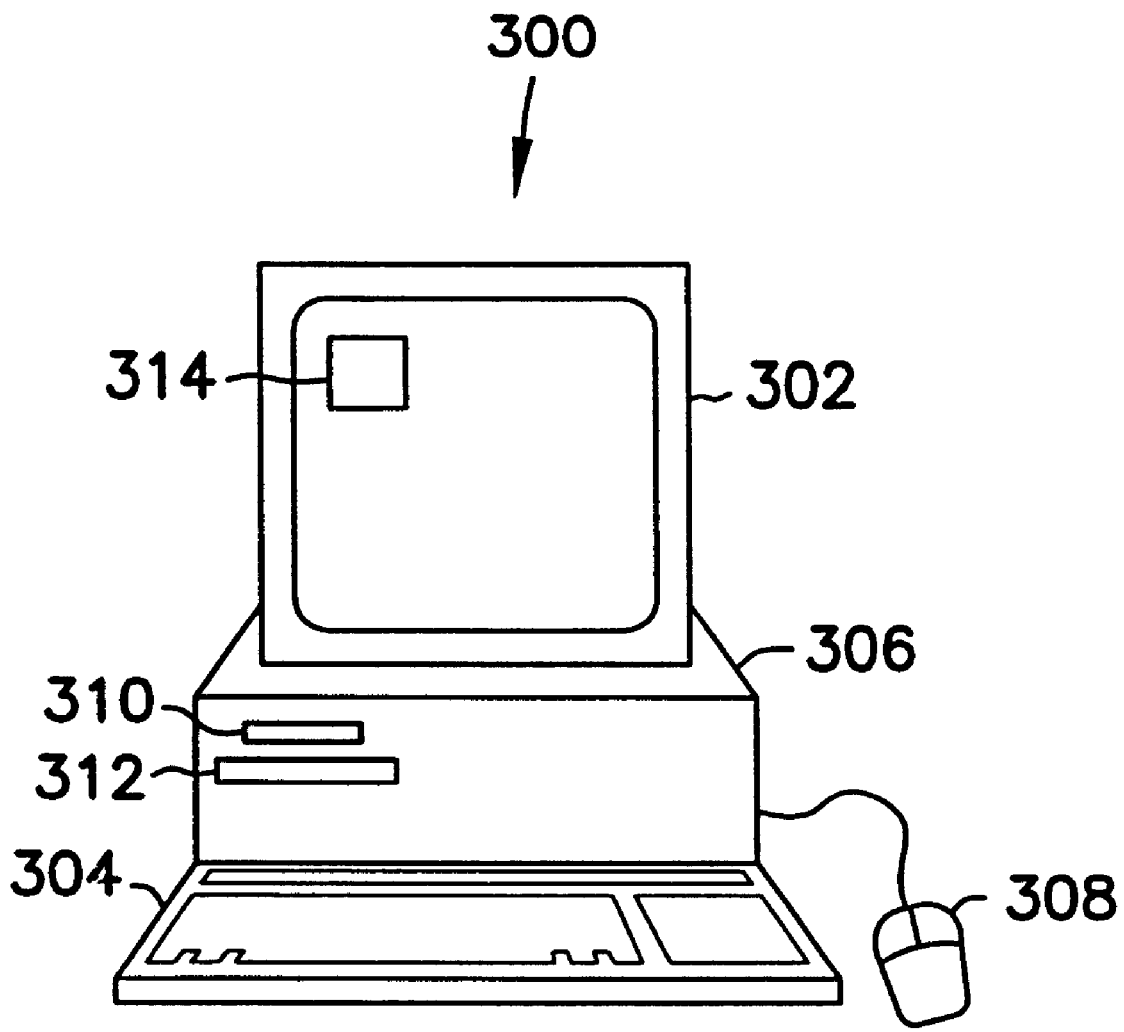
FIG. 3 is a block perspective view of a computer system embodiment of the present invention.

The following detailed description, which references and incorporates FIGS. 1–3, describes and illustrates various embodiments of the invention. An embodiment 100 of a method according to the present invention is shown in FIG. 1. Method 100 comprises operating or launching a first application or applet on a computer in block 102, retrieving functionality information of the first application or applet in block 104, defining a graphical user interface for the first application or applet on the computer in block 106, and controlling the first application with the graphical user interface in block 108. The GUI is defined to control the specific functionality of the application or applet initialized or launched in block 102. Each application or applet will have functions and features which are controllable using the graphical user interface defined in block 108. Further, the functionality of a consumer electric appliance such as a set-top box, television, or VCR connected to a computer system could be programmed into the GUI for operation of a programmable GUI for those appliances.

If another application or applet is launched in block 110, for example by the user navigating to another web page, or by the user opening another application or applet, the method 100 further comprises retrieving the functionality of the newly launched application or applet in block 112, and redefining the graphical user interface in block 106. For each application or applet launched, the method 100 redefines the graphical user interface to integrate the functionality of the new application or applet.

Referring now to FIG. 2, the method of defining the graphical user interface, block 106, is shown in further detail. When the initial GUI is defined, the functionality of the first application or applet is integrated into a graphical user interface for the control of the first application, and the first application is registered for each of its functions with the GUI. When the function is initiated by the user, any application or applet which is registered for the function is notified.

When another application or applet is launched or initialized, as in block 110, the newly launched application has its own set of functions and features, and its own functionality. The graphical user interface defined in block 106 is not abandoned for a graphical user interface for control of the newly launched application or applet. Instead, the GUI is redefined in block 106. The redefining of the GUI in block 106 comprises comparing the functions of the defined GUI to the functionality information of the newly launched application.

In decision block 204, if the function of the newly launched application is already defined in the GUI, then the new application is registered for the function in block 206. In decision block 204, if the function of the newly launched application or applet is not already defined in the GUI, the function is added to the GUI in block 208, and the newly launched application is registered for the function in block 206. The next function of the newly launched application or applet is compared in block 202, until all functions of the new application or applet have been compared and the newly launched application or applet is fully registered with the GUI.

The methods 100 and 106 shown in FIGS. 1 and 2 are implemented in a machine readable medium comprising machine readable instructions for causing a computer to perform the method. Such machine readable medium may include software modules and computer programs. The computer programs comprise multiple modules or objects to perform the methods 100 or 106, or the functions of the modules in apparatus 300. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

Personal computers, such as computer 300 shown in FIG. 3, typically include a monitor 302, keyboard input 304, central processing unit 306, and a pointing or selection device such as mouse 308. Further components of a typical computer system may include a machine readable storage media such as disk drive 310, hard disk, CD-ROM 312, DVD, modem, and the like. The processor unit of such a computer typically includes a microprocessor, memory (RAM and ROM), and other peripheral circuitry, not shown. Further, consumer electric appliances such as set-top boxes, stereos, televisions, and VCRs could also be attached to the computer 300. A GUI generated as described above could be programmed to allow the user access to the functionality of such appliances through the programmable GUI of the embodiments of the present invention.

Computer programs embodying the invention run on the central processing unit 306 out of main memory, and may be transferred to main memory from permanent storage via disk drive 310 or CD-ROM 312 when stored on removable media or via a network connection or modem connection when stored outside of the personal computer, or via other types of computer or machine readable medium from which it can be read and utilized.

For example, suppose a first application or applet is loaded into the computer 306. The applet triggers the adding of its entire list of features or functions to the graphical user interface, shown as object 314 on the screen of monitor 302. The application or applet is added to the graphical user interface 314, and the application registers with the graphical user interface 314 for notification whenever a user initiates a command or event to the graphical user interface which calls for any of its functions. When a second or subsequent application or applet is initiated, the functionality of the newly added application or applet is added to the graphical user interface 314, and is combined with other application and applet functionality already present in the GUI. The application is registered with the graphical user interface to receive notification whenever any command or event initiated by the user calls for a function for which the new application or applet is registered. When the user actuates commands, the appropriate applications which have registered for the commands are notified.

The graphical user interface of the embodiments of the invention overcomes the limited OSDs and lack of windowing in many consumer electronics appliances. This allows the user to access the functionality of the various appliances which may be present.

CONCLUSION

The present invention provides a method and apparatus for creating and redefining a graphical user interface to accommodate the functions and features of multiple computer applications or applets in a shared user interface. As the user navigates between world wide web sites containing applets, and applications of the computer system, the graphical user interface of the computer is redefined. The graphical user interface can be defined and redefined as the user moves between different application and applet contexts. Each application or applet registers its functions with the graphical user interface, so that when a user initiates an event or command to execute a function, any application or applet which has registered as using that function is notified.

The embodiments described above are intended only to illustrate and teach one or more ways of practicing or implementing the present invention, not to restrict its breadth or scope. The actual scope of the invention, which encompasses all ways of practicing or implementing the invention, is defined only by the following claims and their equivalents.

What is claimed is:

1. A method of defining a graphical user interface in response to the functionality of an application or applet, comprising:

launching a first application;

retrieving functionality information of the first application;

defining a graphical user interface for controlling the functionality of the first application;

controlling the first application with the defined GUI;

loading a second application; and redefining the graphical user interface for controlling the functionality of each application, wherein redefining further comprises adding the functionality of the second application to the defined GUI if the functionality of the second application does not already exist in the defined GUI.

2. The method of claim 1, wherein defining the graphical user interface comprises:

adding each function of the first application to the graphical user interface; and registering each function of the first application for notification by the graphical user interface when a user initiates a command calling for a registered function.

3. A method of defining a graphical user interface in response to the functionality of an application or applet, comprising:

launching a first application;

retrieving functionality information of the first application;

defining a graphical user interface for controlling the functionality of the first application;

controlling the first application with the defined GUI;

loading a second application; and redefining the graphical user interface for controlling the functionality of each application, wherein redefining the graphical user interface comprises:

comparing each function of the second application with functions of the defined graphical user interface;

registering the function of the second application with the database for notification by the graphical user interface when a user initiates a command calling for the registered function if the function of the new application is already present in the graphical user interface;

adding the function of the second application to the graphical user interface if the function of the new application is not already present in the graphical user interface; and registering the new function of the second application for notification by the graphical user interface when a user initiates a command calling for the registered function.

4. A machine readable medium comprising machine readable instructions for causing a computer to perform a method comprising:

operating a user interface to a first application;

retrieving functionality information of the first application;

defining a graphical user interface for controlling the functionality of the first application;

controlling the first application with the defined GUI;

loading a second application;

redefining the graphical user interface for controlling the functionality of each application, wherein redefining further comprises adding the functionality of the second application to the defined GUI if the functionality of the second application does not already exist in the defined GUI.

5. A method of operating a computer system, comprising:

defining a graphical user interface responsive to functionality of a first application loaded onto the computer system; and redefining the graphical user interface responsive to the functionality of a second application loaded onto the computer so as to control both the first and the second applications with the graphical user interface, wherein redefining further comprises adding the functionality of the second application to the graphical user interface if the functionality of the second application does not already exist in the graphical user interface.

6. The method of claim 5, wherein defining the graphical user interface comprises:

adding each function of the first application to the graphical user interface; and registering each function of the application for notification by the graphical user interface when a user initiates a command calling for a registered function.

7. A method of operating a computer system, comprising:

defining a graphical user interface responsive to functionality of a first application loaded onto the computer system; and redefining the graphical user interface responsive to the functionality of a second application loaded onto the computer so as to control both the first and the second applications with the graphical user interface, wherein redefining the graphical user interface comprises:

comparing each function of the second application with functions of the defined graphical use interface;

registering the function of the second application with the database for notification by the graphical user interface when a user initiates a command calling for the registered function if the function of the new application is already present in the graphical user interface;

adding the function of the second application to the graphical user interface if the function of the new application is not already present in the graphical user interface; and registering the new function of the second application for notification by the graphical user interface when a user initiates a command calling for the registered function.

* * * * *